US008862386B2

(12) United States Patent
Griffiths

(10) Patent No.: US 8,862,386 B2
(45) Date of Patent: Oct. 14, 2014

(54) SYSTEM AND METHOD FOR JOURNEY PLANNING, FINDING K SHORTEST PATHS THROUGH A TIME/SPACE NETWORK

(75) Inventor: Owen Griffiths, Brisbane (AU)

(73) Assignee: The Boeing Company, Chicago, IL (US)

( * ) Notice: Subject to any disclaimer, the term of this patent is extended or adjusted under 35 U.S.C. 154(b) by 589 days.

(21) Appl. No.: 12/424,458

(22) Filed: Apr. 15, 2009

(65) Prior Publication Data

US 2010/0268447 A1  Oct. 21, 2010

(51) Int. Cl.
*G01C 21/00* (2006.01)
*G08G 1/123* (2006.01)
*G01C 21/34* (2006.01)

(52) U.S. Cl.
CPC .................... *G01C 21/3423* (2013.01)
USPC ...................... 701/411; 340/995.19

(58) Field of Classification Search
CPC .......... G08G 1/0104; G08G 1/096827; G08G 1/123; G08G 1/096816; G08G 1/096811; G08G 1/096844; G08G 1/096888; G08G 1/0116; G08G 1/0129; G08G 1/096861; G08G 1/096872; G08G 1/20; G08G 1/04; G08G 1/081; G08G 1/096716
USPC ......... 701/200, 204, 208, 209, 400–541, 2, 3, 701/14, 25; 340/988–996
See application file for complete search history.

(56) References Cited

U.S. PATENT DOCUMENTS

| | | | | |
|---|---|---|---|---|
| 5,117,684 A | * | 6/1992 | Hwang | 73/146.8 |
| 5,177,684 A | * | 1/1993 | Harker et al. | 701/117 |
| 7,228,207 B2 | * | 6/2007 | Clarke et al. | 701/3 |
| 2005/0107951 A1 | * | 5/2005 | Brulle-Drews et al. | 701/209 |
| 2008/0215409 A1 | * | 9/2008 | Van Matre | 705/8 |

OTHER PUBLICATIONS

Cui et al., "A recursive branch-and-bound algorithm for the rectangular guillotine strip packing problem", Computers and Operations Research, vol. 35, Issue 4, pp. 1281-1291 (abstract only).
"Optimality and Optimisation", http://ntrg.cs.tcd.ie/undergrad/4ba2/network/luke/opt4.html, 2 pgs.
Santos, Jose L., "K shortest path algorithms", Department of Mathematics, Unversity of Coimbra, Aug. 2006, pp. 1-12.

(Continued)

*Primary Examiner* — Muhammad Shafi
(74) *Attorney, Agent, or Firm* — Smith Moore Leatherwood LLP

(57) ABSTRACT

A method and apparatus for selecting a path defining a journey through a time-tabled transportation network comprises determining forming a data set comprising a sequence of K shortest paths through the transportation network from an origin location "o" to a destination location "d", each path with an increasing cost; and selecting a path from the K shortest paths based upon a filter criteria which may be one not used in the determination of the K shortest paths. The network comprises a public transportation network. The filter criteria not used in the determination of the K shortest paths may be one that does not obey the principal of optimality. The determining step is performed utilizing an algorithm that filters the available paths through the network according to a selected filter criteria plus a selected buffer amount Δ of the filter criteria. The selecting step utilizes only the rankings of the K shortest paths.

18 Claims, 9 Drawing Sheets

(56) References Cited

OTHER PUBLICATIONS

Feng, et al., "Optimality and Optimizatino of a Joint Pricing and Inventory-Control Policy for a Periodic-Review System", Department of Systems Engineering and Engineering Management, The Chinese University of Hong Kong, Shatin, N.T. Hong Kong, Third Revision, Jun. 2007.

Chen et al., "The First K Minimum Cost Paths in a Time-Schedule Network", The Journal of the Operational Research Society, vol. 52, No. 1, Jan 2001, pp. 102-108.

Eppstein, David, "Finding the k Shortest Paths", Department of Information and Computer Science, University of California, Irvine, Tech Report 24-26, May 31, 1994.

Chen et al. "Finding the kth shortest path in a time-schedule network", Department of Information Management, National Central University, Naval Research Logistics, vol. 52, Issue 1, pp. 93-102 (Abstract only).

Hollis, et al., "Discrete Optimization Vehicle routing and crew scheduling for metropolitan mail distribution at Australia Post", European Journal of Operational Research 173 (2006), pp. 133-150.

Hollis, et al., "Simultaneous Vehicle and Crew Scheduling with Time Windows for the Product Delivery Problem", Oct. 5, 2007, pp. 1-23.

\* cited by examiner

Table I

| Validity Code 5J | Restriction Applies: | Monday to Friday only. No travel restrictions on other days. |
|---|---|---|
| | Outward Travel | Return Travel |
| | By any train scheduled to depart at or after 0930. Also, at or after 0915 from Bedford or Peterborough. | By any train scheduled to depart at or after 0930, except: Not valid on any services which are scheduled to pass through or depart London Kings Cross, London St Pancras, Moorgate or Kings Cross Thameslink between 1730 and 1830 (inc.), regardless of where you join or leave the services. |

| Validity Code 7B | Restriction Applies Monday to Friday only. | |
|---|---|---|
| | Outward Travel | Return Travel |
| | Morning Peak: By any train scheduled to arrive at London Terminals at or after 1000. Evening Peak: Not valid on any train departing London Terminals between 16.29 and 18.34 inclusive (19.00 for departures from London Kings Cross), with the following exceptions (see notes* below): | Morning Peak: By any train scheduled to arrive at London Terminals at or after 1000. Evening Peak: Not valid on any train departing London Terminals between 16.29 and 18.34 inclusive (19.00 for departures from London Kings Cross), with the following exceptions (see notes* below): |
| | * Travel is permitted on the 16.36 from London Liverpool Street for Braintree line passengers only<br>* Travel is permitted on the 18.03 from London Paddington for passengers travelling Newton Abbot, Crediton or beyond | * Travel is permitted on the 16.36 from London Liverpool Street for Braintree line passengers only<br>* Travel is permitted on the 18.03 from London Paddington for passengers travelling Newton Abbot, Crediton or beyond |

FIG. 7

SYSTEM AND METHOD FOR JOURNEY PLANNING, FINDING K SHORTEST PATHS THROUGH A TIME/SPACE NETWORK

FIELD

The subject disclosure relates to journey planning through a time/space network such as a public transportation system, or a public rail system, with the goal of obtaining a solution comprising a set of K shortest paths from which may be selected the shortest path comprising an optimized journey from an origin to a destination in the transportation system meeting a criteria not used in the obtaining of the set of K shortest paths.

BACKGROUND

Systems and methods exist that that can be used to solve the problem of finding shortest paths through public transport time/space networks, by applying a modification of Dijkstra's shortest path algorithm.

Increasing public transport patronage is an urban challenge and critical element of any public transport strategy. Transport providers must be able to cost effectively supply the traveler with transport information that is: fast, reliable, accessible, comprehensive, accurate, timely, journey specific and complete.

Journey planning algorithms in commercially available journey planners fall into two broad categories. The first type uses pre-calculated algorithms to find "reasonable" paths between defined interchange points in an extensive build step and then uses these at run time to look up journeys. The second, more dynamic type, journey planning at run time, uses mathematical shortest path techniques to calculate the "best" path, which may include one or more "cost" factors, including length of travel distance or duration, a journey avoiding certain change locations or transfers, or combinations of these, etc.

Those skilled in the art will understand that currently existing systems have a number of limitations. Among these are that the existing solutions to the journey planning problem involve running an algorithm to find a set of journeys based on input criteria, then applying any post filter conditions on the results. If any of the found journeys fail any post filtering criteria, the only option is to tweak the input parameters to come up with other options. This is a very heuristic process, and it is easy to find examples where the re-query also does not find suitable answers. There is also no guarantee about whether the results are optimal in cost, as defined by some selected cost function. Finally, this can be very computationally expensive. If the initial set of answers is not suitable, all of the work done to produce those answers is lost and the re-query will have to start from scratch.

With current solutions, the only way to optimize for secondary criteria (user preferences) is to code them directly into the planning process. This is complex to implement, and requires the core planning algorithm to have detailed knowledge regarding the wider system in which it is being used, which impedes modularity and re-use. Implementing these secondary criteria can also only be done by maintaining extra labels in the dynamic programming process. Further, some criteria don't obey principles of optimality, which makes them very difficult to utilize in a dynamic programming solution such as the K shortest path selection of the present application and the like, due to the computational power, computational time, required memory or other limiting factors. Such principles, as discussed by way of example in "Optimality and Optimisation", http://ntrg.cs.tcd.ie/undergrad/4ba2/network/luke/opt4.html, may be used to compute actual best paths in a network with some knowledge about such things as details of topology, traffic and other metrics of the network. A function may be generated that is subsequently optimized. A general statement about optimal routing may be made that if node j is on the optimal path from node i to node k, then the optimal route from j to k also falls along the same route. From the optimality principal it is possible to generate optimal routes between sources and destinations for an entire network, forming a so called sink tree. As used herein criteria that are very difficult or difficult to use for a dynamic programming solution, because, e.g., they do not obey the principal of optimality are meant to include both those that mathematically cannot be so used or as to which the use is economically not feasible.

Shortest path solutions for non-timetabled networks are known. See Santos, J., "K shortest path algorithms", 2006. Department of Mathematics, University of Coimbra, available on the Internet, and Eppstein, D., "Finding the k shortest paths," 35th IEEE Symp. Foundations of Comp. Sci., Santa Fe, 1994, pp. 154-165. Chen, Y. L. et al, "Finding the Kth shortest path in a time-schedule network," Naval Research Logistics, Volume 52 Issue 1, Pages 93-102, discusses finding a single kth shortest path in a time scheduled network using a polynomial time algorithm, which suffers from the same shortcomings as finding the single shortest path in a time/space network, as noted above.

Boeing co-pending patent application Ser. No. 12/099,327, entitled SIMULTANEOUS VEHICLE ROUTING, VEHICLE SCHEDULING, AND CREW SCHEDULING, filed on Apr. 8, 2008, discloses a method for generating a transportation plan, wherein a set of transportation requests are identified, an initial transportation plan having a set of vehicle routes, vehicle schedules, crew designations are created, and simultaneously modified repeatedly until a plan meeting a specific plan objective is determined.

As discussed in T. Yang, et al., "Branch and Bound Algorithm", available on the Internet, branch and bound is a general search method, which involves starting by considering a root problem (such as the original problem with a complete feasible solution region), and recursively applying bounding, such as with lower-bounding and upper-bounding procedures applied to the root problem.

Accordingly, there is a need in the art for systems and methods to facilitate automated definition of a journey path from a journey origin to a journey destination whereby quantifiable definitions of what is the "best" journey, factoring in user preferences, may be easily and effectively provided.

SUMMARY

The present disclosure discloses a system and method providing a solution to the K shortest path problem in a time/space networked (time-tabled network) utilizing a modification of a shortest path algorithm such as Dijkstra's algorithm and employing a branch and bound procedure that may be used to solve the K shortest path problem with minimal disruption to a network data structure. The system and method, therefore, facilitates efficient processing of a sequence of requests for planning travel, where the universe of the network is reduced to K shortest (lowest cost function value) paths which may then be further processed according to rules, information, criteria, and the like that do not readily lend themselves to mathematical optimization analysis or the like.

Existing systems and methods for journey planning through a time-space timetabled transportation network, i.e., via train, airplane, subway, bus etc. and combinations thereof, often arrive at a solution for the shortest (smallest cost factor value) path which is not the "best" solution when further customer desires regarding the journey from the selected origin to the selected destination have not been and cannot be optimized with existing algorithms used to select the single shortest path. Contrary to the existing systems and methods, which would then have to re-compute another shortest path and then determine if it meets the customer preference, and so on until one is found that meets such a secondary criteria. The claimed subject matter finds a sequence of ranked Kth shortest paths and then applies the secondary criteria to sequentially eliminate shortest paths that do not meet the secondary criteria, which secondary criteria are not reasonably utilized in the shortest path optimization process, because, e.g., such process is unacceptable from the standpoint of time (customer satisfaction), money (computational resources and complexity required), etc.

Systems and methods are disclosed relating to the use of K shortest paths journey planning which may be utilized to find a "best possible journey path" for a given selected quantifiable definition of "best." A method for selecting a path defining a journey through a time-tabled transportation network according to a possible embodiment comprises forming a data set, utilizing a computer-readable memory, the data set representing a sequence of K shortest paths through the transportation network from an origin location "o" to a destination location "d", each path with an increasing cost function value; and selecting a path from the K shortest paths, which selection is based upon a filter criteria other than any used in the determination of the K shortest paths. The network comprises a public transportation network. The filter criteria other than that used in the determination of the K shortest paths is one that does not obey the principal of optimality. The determining step is performed utilizing an algorithm that filters the available paths through the network according to a selected filter criteria plus a selected buffer amount Δ of the filter criteria. The selecting step utilizes only the rankings of the K shortest paths.

BRIEF DESCRIPTION OF THE DRAWINGS

The features, functions, and advantages that have been discussed can be achieved independently in various embodiments of the present disclosure or may be combined in yet other embodiments further details of which can be seen with reference to the following description and drawings, wherein like numerals depict like elements, and wherein:

FIG. 7 is a table illustrating legality check rules for two tickets; and,

DETAILED DESCRIPTION

Figure 1A:
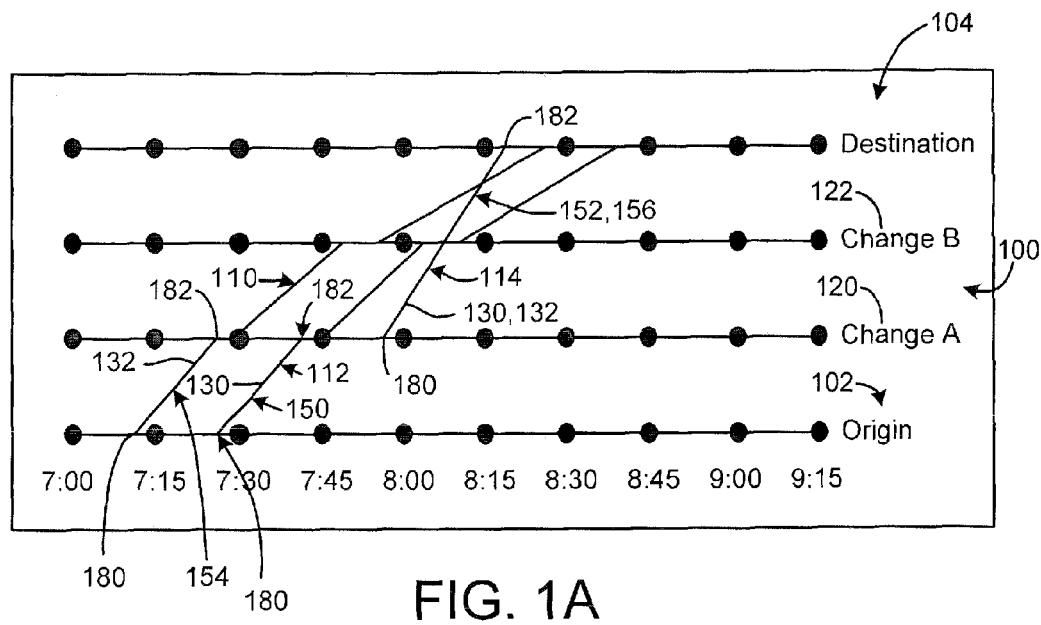
FIGS. 1A, 1B and 1C, separated for clarity of illustration, show schematically a model of a journey from a journey origin to a journey destination having a plurality of possible paths illustrating, among other things, the application of Dijkstra's algorithm.
Figure 1B:
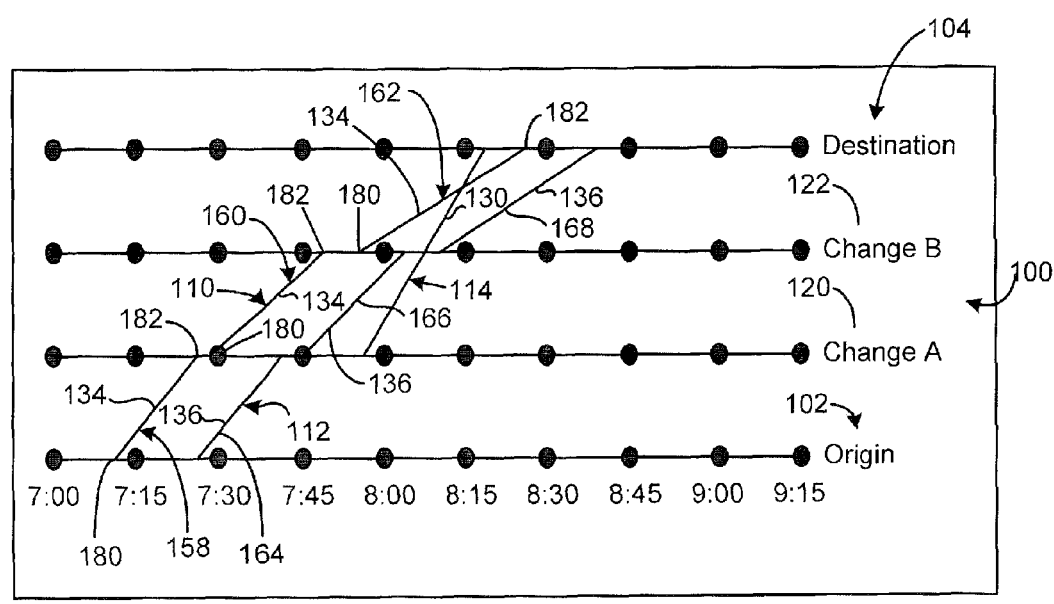
Figure 1C:
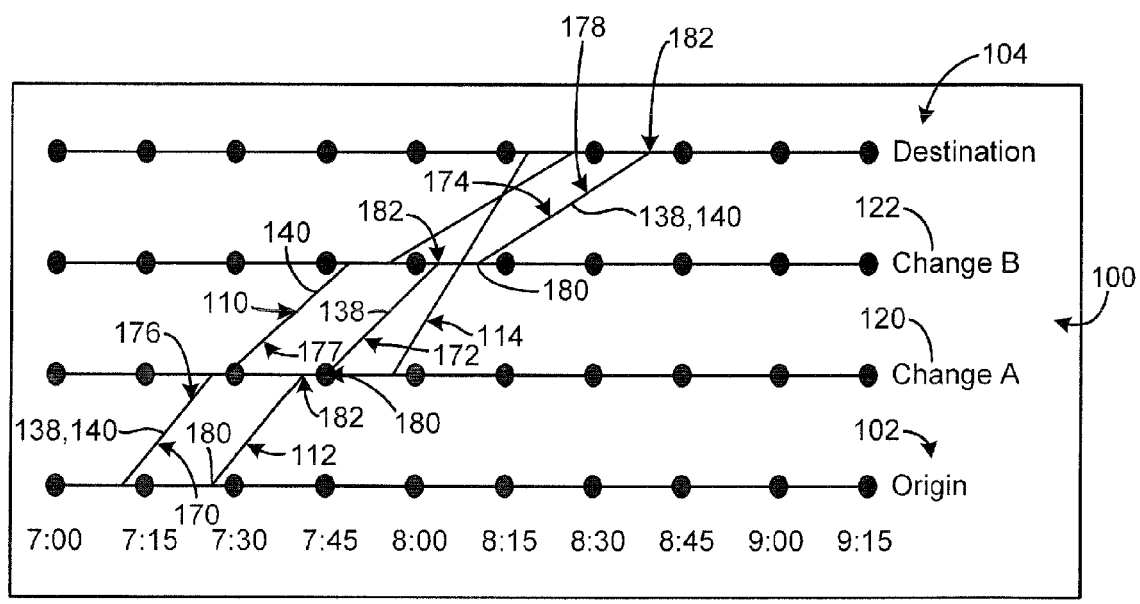

Turning now to FIGS. 1A, 1B, and 1C, there is shown a schematic diagram of a model of a time-tabled network, such as a public transportation network in a big city. There is illustrated a model transportation system 100 with the opportunity to travel between and origin "o" 102 and a destination "d" 104 along one of three transportation lines, such as rail lines 110, 112 and 114, with intermediate stops, such as at a first train station, "change A" 120 and a second train station, "change B" 122, with each of the rail lines 110 and 112 originating at the overall journey origin "o" 102 and going to the overall journey destination "d" 104, passing through and stopping at the intermediate "change A" 120 and "change B" 122, while the third rail line 114 originates at "change A" 120 and travels to the destination "d" 104, without a stop at "change B" 122, or at least without the ability for passengers to make any changes at "change B" 122. Stops by the rail lines 110 and 112 in the "change A" and "change B" stations, e.g., to discharge and admit passengers are represented by the horizontal portions of the rail line 110, 112 models, shown in FIGS. 1A and 1B.

A journey as used in the present application includes a path from an origin such as origin station "o" 102 in FIGS. 1A-C to a destination such as destination station "d" 104 in FIGS. 1A-C. The journey may be made up of one or more trips on a single transportation vehicle, underground, train, airplane, bus on a single scheduled route (line), such as the rail lines 110, 112 of FIGS. 1A-C or some portion thereof, defined by at least one segment of a plurality of segments of the trip on the particular route. That is, a trip on rail line 110 may comprise traveling on rail line 110 from origin "o" 102 to destination "d" 104 on rail line 110 passing through intermediate stops "change A" 120 and "change B" 122, or a subset of this trip from "change A" 120 to destination "d" 104, or from "change A" 120 to "change B" 122, or from "change B" to the destination "d" 104, with each such trip possibly being a leg in a path making up an overall journey from the origin "o" 102 to the destination "d" 104. Each single portion of such a trip, i.e., from a stop i to a stop i+1 in the network along the trip route in the network (or a stop j–1 to a stop j along the trip route in the network) constitutes a segment.

The model, therefore, illustrates 6 possible journey paths 130, 132, 134, 136, 138 and 140 between the journey origin "o" 102 and the overall journey destination "d" 104 in the model of FIGS. 1A-C. In order of increasing duration, the paths shown include a path 130 comprised of a segment 150 of a trip on rail line 112 between origin "o" 102 and "change A" 120 followed by a segment 152 of a rail trip on rail line 114 from "change A" 120 to the overall journey destination "d" 104. This, as shown by the time markings on the chart modeling the time-tabled network system 100, corresponds to the fastest journey from the overall journey origin "o" 102 to the overall journey destination "d" 104, roughly 52 minutes. It also, in this particular model, represents the path with the earliest arrival time at destination 104 and the latest departure time from the overall journey origin 102 to the overall journey destination 104.

It will be understood, also that the first overall journey path 130 just defined comprises a plurality of journey legs, which in this case correspond to the trip segments 150 on rail line 112 and 152 on rail line 114, that define an overall journey path 130. Also, each such segment 150, 152 of the overall journey path 130 has its own distinct origin "o" and destination "d", with the segment origin 180 of segment 150 corresponding to the overall journey origin "o" 102 and the segment destination 182 of segment 150 at change A 120. The origin(s) 180 and destination(s) 182 for the segments of the trip on rail line 114 are illustrated in FIG. 1A, for the segments of the trip on rail line 110 in FIG. 1B, and for the segments of the trip on rail line 112 in FIG. 1C. Similarly, to form a valid overall path leg, the path 130 leg (in the case of path 130 corresponding to segment 152) has its origin 180 at "change A", the destination ("termination") of the segment 150 of the trip on rail line 112.

The second overall journey path 132, illustrated in FIG. 1A, is made up of a segment 154 of a rail trip on rail line 110 from the overall journey origin 102 to the destination "d" 104, with the segment 154, having an origin at the origin "o" 102 and a termination at "change A" 120. This is followed by same rail trip on rail line 114 from "change A" 120 to the overall journey destination 104, segment 156 (the same as segment 152 for the shortest journey path 130 noted above). Thus, this overall journey path 132 similarly has two legs, each comprised of a trip segment 154, 156, respectively with a segment 154 origin 180 at the overall journey origin 102 and a segment 154 destination 182 at "change A", and a segment 156 origin 180 at "change A" and segment 156 destination 182 at the overall journey destination 104.

A third overall journey may be defined by a path 134 made up of the rail line trip on rail line 110. With respective segments 158, 160 and 162 respectively having segment origins 180 at the overall journey path origin "o" 102, "change A" 120 and "change B" 122, and segment destinations 182, respectively at "change A" 120, "change B" 122, and the overall journey path destination 104.

A similar overall journey path 136 may be made on rail line 112, with segments 164, 166 and 168 respectively having segment origins 180 at the overall journey path origin 102, "change A" 120 and "change B" 122, and segment destinations 182, respectively at "change A" 120, "change B" 122, and the overall journey path destination "d" 104.

A fifth overall journey path 138 illustrated in FIG. 1C, may be made having a first leg comprised of a segment 170 on rail line 110 with a change at "change A" to a second trip on rail line 112, comprising a leg having segments 172, 174 of the rail line 112 trip. The final possible overall journey path 140 having a trip leg comprised of first and second segments 176, 177 of the trip on rail line 110, respectively, to "change B" 122, followed by a segment 178 of the trip on rail line 112 from "change B" 122 to the overall journey destination 104.

It will be seen that each valid journey path starts at the overall journey origin "o" 102 and ends at the overall journey destination "d" 104, and has a respective leg (segment) arrival time preceding the respective next leg (segment) departure time.

It will be understood that other forms of transportation such as air travel, bus travel, along with train travel, or combinations of the three, as well as other possible transportation systems may be modeled in the same fashion.

Of the 6 modeled paths 130, 132, 134, 136, 138, 140, only one would be considered a "fastest" or "best" journey in prior solutions, i.e., path 130, if "shortest" or "best" were based on a shortest time duration criteria. The other five would be considered longer/slower ("more costly") options.

Figure 2:
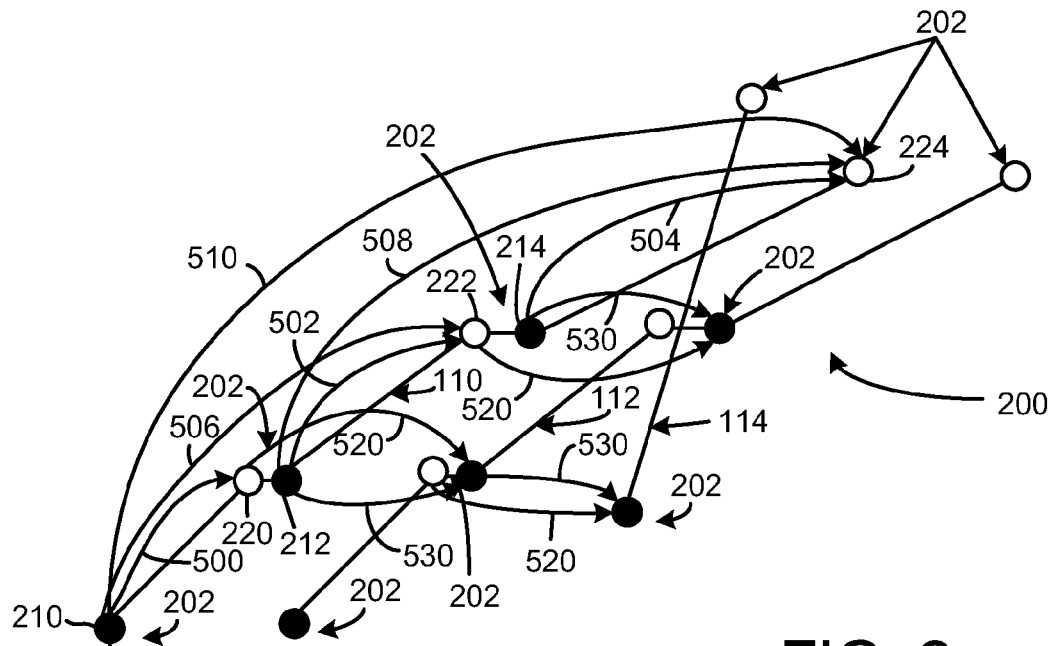
FIG. 2 shows schematically a further model of a journey from a journey origin to a journey destination having a plurality of paths.

A more explicit transportation network, respecting the selection of a shortest path or the K shortest paths through a basic arc/node network can be modeled as shown by way of example in FIG. 2, modeling the same network found in FIGS. 1A-C. All arcs are available, and have a constant "cost function" for example, such as journey duration or monetary cost, etc. for all paths. It is thus possible to model the public transport network into this form.

The nodes 202 in the network 200 of FIG. 2 become a particular location for every departure circle (such as departure circles 210, 212 and 214 on rail line 110) and arrival circles (such as arrival circles 220, 222 and 224 on rail line 110. The arcs, such as arcs 500, 502, 504 are seen to join a respective departure node (such as represented by departure circles 210, 212, 214) to each succeeding arrival node, such as arrival circles 220, 222 and 224 along the same path of a journey, in this case the path 134 comprised by a trip along same rail line 110 from journey origin "o" 102 to journey destination "d" 104. Arcs 500, 502, 504 model actually traveling on the trip, meaning the journey path from a respective originating departure circle at a journey path node to subsequent journey path nodes, on the same rail line, such as rail line 110, 112 or 114 as illustrated in FIGS. 1A-C and again shown in the FIG. 2 with trip segments 500, 502, 504. Thus arc 500 connects originating/departure circle 210 with destination/arrival circle 220, arc 502 connects departure circle 212 with arrival circle 222, arc 504 connects departure circle 214 with arrival circle 224. Arc 506 connects departure circle 210 with arrival circle 222, defining a trip leg with segments 500 and 502, arc 508 connects departure circle 212 with arrival circle 224 defining a trip, e.g., with segments 502 and 504, and arc 510 connects departure circle 210 with arrival circle 224 defining a trip leg with segments 500, 502 and 504. These arcs have only been added for the rail line 110 to reduce clutter. For a full representation, there should be another 6 arcs on the trip on rail line 112 just as shown for the rail line 110, and another single arc for the trip on the rail line 114.

There are also arcs 520 linking an arrival node to the next departure node that satisfies any required interchange time rule. This models a passenger getting off the one trip on a rail line at the end of a leg comprising one or more segments at a journey path leg destination, and taking the tightest legal connection available for a subsequent trip leg comprised of one or more segments on another rail line to, e.g., complete the journey on the journey path on a second rail line. Finally, there are arcs 530 linking each departure node to the next departure node at the same stop ("change A", "change B" in the illustrated model of FIGS. 1A-C and 2). This models waiting at the stop for another departure on the separate trip on another rail line.

A timetabled network consists of a set of stops and a set of trip legs made up of one or more segments such as is modeled in FIGS. 1A-C and 2. A trip is a time-tabled service. It consists of a sequence of (stop, time) pairs. Each trip must pass through at least 2 stops, e.g., contains at least one segment and there is no upper limit on how many stops a trip can pass through. A trip can be circular (i.e. can visit a single stop multiple times). An example trip may be that on rail line 112 illustrated in FIGS. 1A-C, including a leg origin 180 at a journey origin "o" 102 at a departure time 7:25 AM, a stop at "change A" 120 at an arrival 182 with an arrival time of 7:40 AM (segment 164), and a departure time of 7:45 AM, a stop at "change B" 122 at an arrival time of 8:03 AM (segment 166) and departure time of 8:12 AM, and finally a stop at the journey destination "d" 104 at an arrival time 8:40 AM (segment 168).

A trip leg (made up of at least one segment) is a portion of a trip that a passenger travels on. In could be the whole trip (as just denoted) or only a subset, such as from the journey origin "o" 102 to "change B" 122 on rail line 112 (segments 164 and 166) or from "change B" 120 to journey destination "d" 104 on rail line 110 (segment 162). Each trip has a order of magnitude of $n^2$ possible number of segments, that is in the current network (StopCount)$^2$, possible trip legs, where n=StopCount, the number of stops on the trip. For the example in the trip on rail line 110, as illustrated schematically in FIG. 2, there are three stops and six possible legs, 500, 502, 503, 506, 508 and 510, six being on the order of $3^2$.

A customer provides the system with a journey query, constituting a journey origin "o", journey destination "d" and an earliest departure time from the journey origin "o". The system produces a set of journeys, K shortest paths. Each journey is a sequence of trip legs (of one or more segments) which allow the customer to travel from the desired journey origin to the desired journey destination. Each enumerated journey has a sequentially increasing value for the "cost function" from the "shortest"/"lowest cost" path on up.

A transportation network, such as a rail system, may have a set of rules applied to calculate the price a passenger should pay to undertake a particular journey. These and like rules, however, cannot easily be coded directly into the journey planning rules, as discussed above, due to unreasonable requirements for computational power, computational time, required memory, or the like, however. Finding a set of journeys based on time "cost," then applying the fare rules afterward yields sub-optimal results because, if any of the found journeys do not satisfy the fare rules, one would not get the best answer based on customer preference, and worse, may get no answer at all. As noted above, as used herein criteria that are very difficult or difficult to use for a dynamic programming solution, because, e.g., they do not obey the principal of optimality, are meant to include both those that mathematically cannot be so used or as to which the use is economically not feasible. This could include criteria that may be optimized in the context of the transportation system of the present application, or the like, only with a computer with capabilities far beyond what economically may be appropriate for the context, such as the difference between a PC or server of like memory and computational capacity and a super-computer, such as a Cray®, within a reasonable computation time, such as a few seconds to a few minutes while the customer awaits results at such as a kiosk or home or office computer terminal, i.e., utilizing a resource constrained shortest path(s) technique.

The present disclosure extends previous solution using the K shortest paths through a time/space network, such as a time-tabled transportation network, to find different journey options. This can enable the application of post filter rules to only the resultant list of K shortest path journeys. As noted, with a Dijkstra type algorithm, if the single shortest path journey culled from the set of possible journey paths does not meet the post filter criteria, it is difficult, if not impossible, to get well defined higher cost options from the initial culling. The end customer preference for a journey (secondary criteria) even though such a preferred journey is no better (or even worse) than the culled journey, culled based on costs coded into the shortest path calculation, may also be impossible to satisfy with the selected path.

Thus, according to the present disclosure, the option generation for a given arrival time may be culled, and force the search to move later in the day to derive further possible journey options. For a given arrival time, existing algorithms utilized in existing journey planning systems and methods, return journeys with increasingly early depart times, so the journey duration is monotonically non-decreasing. What is proposed is a system and method for enumerating journeys, the "K shortest path journeys" which individually can then be checked against, e.g., criteria difficult to use to obtain a dynamic programmed solution, i.e., to be optimized, such as because it fails to obey the principle of optimality, or, for like reason, not conveniently or efficiently being able to be included in existing journey planning optimization systems and methods, such as fare rules. In so doing, a system and method according to the disclosure may be used to find the best overall journey solution answer from amongst a rated list of K journey paths, by selecting the path that both has the lowest cost function value and also meets whatever post filter requirement (secondary criteria) is dictated by a particular customer preference(s).

According to the present disclosure, it has been determined that it is advantageous to apply a maximum journey threshold, such as may be calculated as a function of the optimum journey according to a cost factor under consideration, such as for example, shortest journey duration in time, and then defining some range of results to be further culled. As an example, the journey planning system and method may enumerate all journey options with a duration less than or equal to the shortest duration, plus some selected cost function value, such as a selected time period, such as one hour, the shortest path having been discovered by use of Dijkstra's algorithm or the like.

According to a possible embodiment the journey planning system and method disclosed may be used to find journeys in successively higher "cost" order (higher values of the selected cost function factor, like trip duration, etc.) This contrasts with finding the single "best" journey as defined by prior art systems and methods that sort this single "best" journey from all other possible journeys through the time/space network from a given origin to a given destination within some other possible defined criteria, such as within a given time period, such as on a given day.

The "cost" of a journey, as is well known in art of optimization, can be measured by any suitable cost function or combination of such. For example, it may be defined by shortest trip duration, or smallest total fare, or a journey not passing through a certain station(s). Another cost factor may depend, e.g., on both the departure time from the origin and the arrival time at the destination. Specifically, such "cost" may be thought of as increasing the later the journey arrives at the destination, and for a given arrival time, increasing as the journey departure time from the origin gets earlier. The journey planning system and method disclosed avoids the production of an enormous number of increasingly longer journeys for an arrival time into the destination before moving on to a later arrival time. This allows a subsequent filter criteria, which may be employed to customize an optimum ("best") journey path for a given customer, e.g., a time of day threshold that will never be met without moving the arrival time to a later time, such as may be the result from prior journey optimization systems and methods optimizing the journey based on duration of the journey.

After the determination of the K shortest paths, according to the disclosure, there may then be utilized further sorting criteria (secondary criteria) such as fare rules, which, as noted above, may not be conveniently subjected to optimization, or otherwise not be suitable for inclusion in such as a Dijkstra-type algorithm or the like in the initial culling. These further criteria, e.g., relating to particularized user customized choices for the journey, according to the present disclosure, may then be applied only to a data set comprising a selected set of journeys, culled from the universe of possible journeys from origin "o" to destination "d", with increasing cost function value from the "shortest" path value, e.g., to a given Δ change in the cost function value of the "shortest" path. That is, the data set may represent a set of journeys including the shortest duration journey and any others with a duration up to some Δ change, e.g., one hour, longer than the shortest duration, which may also be limited by selecting only up to the first K journeys in increasing cost value that are within the Δ.

Information needed for appropriate utilization of a journey planning system and method after an initial culling according to the present disclosure may represent criteria that do not conveniently and/or mathematically obey the principals utilized in optimization algorithms, such as the principal of optimization.

By way of example, some side constraints (so-called secondary criteria or post filter rules) that a customer/passenger may wish to put on the journey from origin "o" to destination "d" may be effectively and efficiently utilized with existing shortest path solutions, such as, "not via" or "maximum changes." The "not via" constraint may be that the journey path selected does not go through a particular station or airport or the like. The "maximum changes" constraint may constrain the ultimately selected journey path to have less than or equal to some selected number of trip changes. That is, the trip on a single train line or single airline route, without a train/plane change is a trip and the journey can have up to X trips. Having to get off of the train or change to a different aircraft at a given airport stop is considered the end of that particular trip in the journey and the start of another, and the constraint may allow this to happen not more than some selected number of times for a given journey. These and like types of constraints, since, among other possible characteristics, they obey the principle of optimality, may be correctly implemented using well understood resource constrained shortest path techniques.

Other constraints, which, among other possible characteristics, do not obey the principle of optimality, cannot be effectively and efficiently implemented with systems and methods existing in the art. Examples in a time-tabled rail system, include routing guide determinations (legality checks), and fare determinations (legality checks), e.g., does the path obey ticketing requirements such as noted in FIG. 7, e.g., for the desired date and time of travel, including, e.g., the availability of a discount fare for the desired date and time of travel, or are there any tickets left available for a quota bearing ticket. Shown in FIG. 7 is a table showing examples of fare determination (legality check) rules. A passenger/customer can buy a ticket for a certain price for any journey which meets certain rules. The rules for exemplary 5J and 7B tickets are given in the table in FIG. 7. The complexity of these and similar rules (particularly the exceptions), necessary to evaluate a customer constraint on the journey (e.g., total cost or coverage under a particular form of ticket, etc.) makes these rules unsuitable for incorporating in existing standard shortest path calculations.

In addition, even if these and like rules could be implemented in a resource constrained shortest path determination, there may be many different rules, and they may be subject to frequent change, e.g., multiple times each year. It is thus infeasible to implement these rules directly in existing journey planner systems and methods. It is much simpler, according to a possible embodiment of the disclosure, to have the planner produce a set of possible journeys of increasing "cost", which may then be checked, in order of increasing "cost", to find the journey with the lowest "cost function" value that is also in compliance with the rules (secondary criteria) unique to the desired journey.

According to one embodiment of the present disclosure, one may set up a network of all the trip legs run within a certain time period, such as on a given day, or within a given twenty-four (or other selected number) hour period, for a rail transportation network, e.g., on a day D. This defines a set of trip legs having a number of arcs roughly equaling the number of trips*(stops per trip)$^2$. In this context, a trip is defined as a sequence of trip segments on a single transportation line in a single transportation vehicle, i.e., train, underground, bus, airplane, etc. A journey path in turn may be made up of one or more trips, each forming a leg of the path and comprising at least one trip segment from one stop on the trip route to the next route stop.

Figure 3:
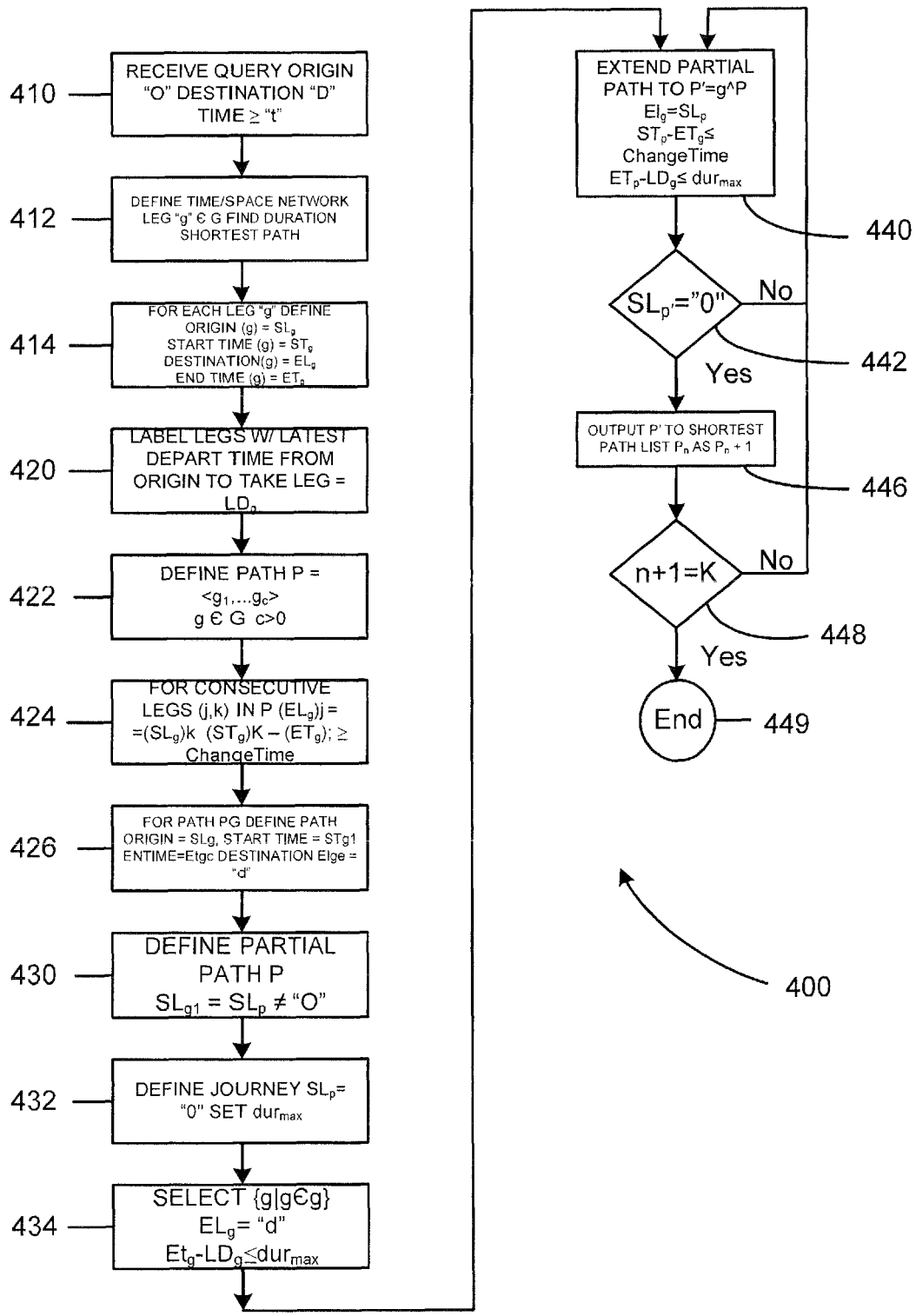
FIG. 3 shows in block diagram form a process implementing a journey planning system and method according to a possible embodiment of the disclosure.

Turning now to FIG. 3 of the system and method of the present disclosure may first receive a customer/passenger query, for a journey between an origin "o" and a destination "d" starting at a time/date after some selected time/date. This is represented in box 410 of the flow chart of FIG. 3.

The possible embodiment of the system and method may define the time space network as a plurality of individual legs "g" contained within the network, a set of all legs G. This may be done for example as a part of performing a shortest path algorithm, such as Dijkstra's algorithm, to find the shortest ("lowest cost") journey path from origin "o" to destination "d". Similarly the legs may be defined as indicated in block 414 of the flow diagram of FIG. 3, such as $SL_g$: the origin location for the leg g; $ST_g$: the start time of the leg g; $EL_g$: the destination location for the leg g and $ET_g$: the end time of the leg g.

The subject embodiment may label each leg, e.g., each connected set of segments of a trip, with the latest time a passenger can leave the origin "o" to get onto that leg (−∞ for legs that cannot be reached), as indicated in the flow chart at box 420.

In the representative model depicted in FIGS. 1A-C and 2, the trip leg (segment) 152, 156 on rail line 114 from "change A" 120 to destination "d" 104, though it does not itself pass through the origin "o", is reachable by changing from one of the trips, such as on rail lines 110 or 112 that do reach back to the origin "o" and would be labeled with the time of the departure of the leg 150. The trip leg with segments 164, 166 and 168 of the path 136 for the trip on rail line 112 would be labeled with the departure time from the origin "o" 102 of the initial leg segment 164 of the trip on the rail line 112 as the latest time of departure from the origin on that trip of three legs (segments) to reach destination "d" 104.

Figure 8:
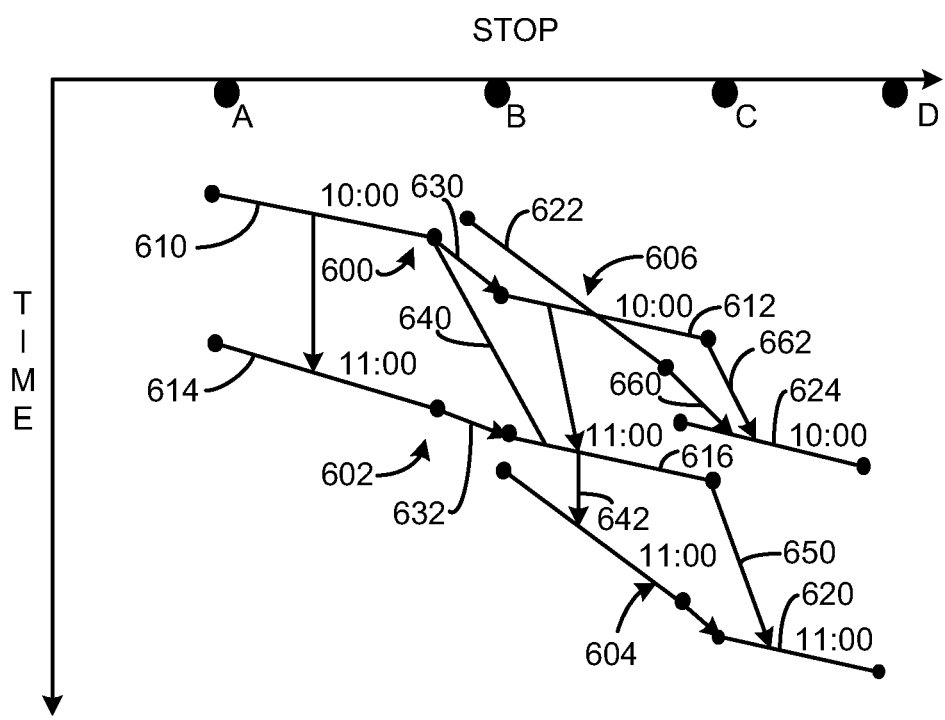
FIG. 8 shows schematically a model of a journey from a journey origin to a journey destination having a plurality of possible paths.

FIG. 8 shows an example of a number of journey paths 600, 602, 604 and 606, the latter of which has a leg 622 that cannot be reached by an earlier leg going back to the previous stop, and so is labeled with −∞. Otherwise, the legs 610 or trip 600 and 614 of trip 602 have earliest departure times from the origin "o" (not shown in FIG. 8 for simplicity purposes), which in turn are passed on to the respective subsequent trip legs 612 and 616, as indicated by the arrows 630 and 632 respectively. The trip 604 does not itself have a leg extending back toward the origin "o", and has a departure time that is too close in time to allow a change from the leg 614 of trip 602, but can be reached by a change from the leg 610 of trip 600, and thus is labeled with the departure time from the origin accorded to leg 610 as its latest departure time from the origin "o" as indicated by the connections of arrows 640 and 642. The subsequent leg 620 of the trip 604 can be reached by a change from the leg 616 of the trip 602, and thus can be labeled with the latest departure time of leg 616, as illustrated by arrow 650. Similarly, while leg 624 would get −∞ passed to it by leg 622 of trip 606, as indicated by arrow 660, it is reachable by a change from leg 612 of trip 600, and thus can be labeled with the latest departure time of leg 612, as illustrated by arrow 662.

As illustrated schematically in FIG. 8 a network of four trips 600, 602, 604 and 606 can each be labeled according to the latest depart time for leaving A, with the latest depart time labels not being a function of the destination, but only the departure time from the origin. The trip 604, which can be boarded at stop B after leaving A on the leg 610 of trip 600, even though the trip 604 does not itself have a leg going back to A. Further, the leg 620 of the trip 604 can be boarded at C by leaving A on the trip 602 and thus be labeled with the latest departure time for leg 616 of trip 602. The only unreachable segment in the first part of the trip 606, as there is no path from A that gets to B early enough to board the trip 622.

Starting with legs into the destination "d", the system and method may then enumerate paths through the network by recursively pre-pending connecting trips/legs to existing paths. The system and method may assume each successive leg of a trip has a reference to the latest arriving leg that has a legal interchange to the existing journey, because the trip by definition is on a single transportation vehicle on a single line. The legs may also be assumed to be "threaded" so that each leg has a reference to the previous leg arriving at the same stop (e.g., "change A" 120 or "change B" 122). In this manner, the system and method according to the present disclosure may be used to find all the possible connections that can extend the path currently under evaluation backwards towards the origin.

The modified paths (extended partial paths) may then be pushed into a priority queue, which may be sorted by the latest possible journey depart time from the origin of the latest leg added to the partial path (latest depart times popped off first in sequential order). As each trip leg is labeled with latest possible depart time, this may be efficiently accessed by sorting the time labels. Whenever a path is popped off the queue which starts at the query (journey) origin "o" 102, a new journey option is determined. No extending is done on a path from the origin. This could only yield journeys that travel through the origin twice, which are automatically considered bad journey options.

Therefore, unlike the prior art systems and methods, the K shortest path system and method according to the present disclosure retains information from earlier answers to efficiently produce new options. Such a procedure can be conceptually considered as a branch and bound procedure. The branches are the possible journey legs leading backward toward the origin from the current stop on the journey defining a partial path leg origination point at that respective stop and the bounds are the departure times from the origin "o" to arrive at the current leg.

A pseudo code can be utilized to visualize the procedure. The pseudo code, shown in Appendix A to this application, may represent the following procedure steps, referring also to FIG. 3. Each trip leg into a given journey stop, such as destination "d", "change A" or "change B" illustrated in FIGS. 1A-C and 2, may be labeled with latest depart time from the origin "o" for a particular query (journey), with a $-\infty$ for unreachable legs. The process may then set a maximum journey duration as the minimum journey duration plus a buffer, such as one hour, the minimum journey duration having been found using such as Dijkstra's algorithm.

For each trip leg (segment) into the current intermediate destination currently under consideration, starting backward from the journey destination "d" to the journey origin "o", if the leg arrive time–latest depart label≤the maximum journey duration, the currently evaluated leg in the queue may be added to the currently existing leg of a partial path being extended toward the origin "o" 120.

This is not a solution yet, however, since the origination point for the leg $O_l$ is not the origin "o" 102 of the query (journey). Similarly, the leg 168 of the trip on rail line 112 from "change B" to the destination "d", has an arrival time and a latest departure time to get to that leg, i.e., on that same trip on rail line 112, such that, if the arrive time minus the latest departure time to get to change B on rail line 112 is less than or equal to the max journey duration, then this leg 168 is added to the priority queue, in this case as the first leg of a partial path being constructed from "d" 104 back toward the origin "o" 102. This is similarly done with respect to the leg 162 of the trip on rail line 110 from change B to destination "d", vis-à-vis the arrival time of leg 162 a the destination "d" 104 and the latest departure time to get onto leg 162, which is the time of departure 180 for leg 158 on path 134 on rail line 110.

If the queue is not empty, this partial path may be placed at the top of the queue. If the top path has an origin at the journey origin "o" then the top path comprises a full journey and is stored to a list comprising a sequence of journey paths of, in this example, increasing trip duration, in the list of journey paths from "o" 102 to "d" 104. If not then the path comprises a partial path and is further extended using the above process until a leg is added to the newly created partial path that has as its leg origin $O_l$ the journey (query) origin "o".

The process of extending a partial path P' may be considered to operate as follows. A latest journey depart time for the journey being evaluated to extend a partial path previously placed in the queue is determined such that the partial path arrive time minus the maximum allowable journey duration equals the latest journey depart time. This can then be used, as noted below, to consider adding a given leg to the partial path creating a new partial path. The new partial path P' further extends the previously existing partial path toward the origin "o" 102. The new partial path P' may be popped from the queue as a possible journey if the new leg origin $O_l$ is the journey (query) origin "o". Otherwise, the new partial path P' is again extended by evaluating the new partial path vis-à-vis latest departure times for legs terminating at the origin $O_l$ of the leg just added to the new partial path P'.

The system and method may also take into account change times that may be utilized at a given change stop, such as illustrated by change A 120 and change B 122 in FIGS. 1A-C and 2. The change stop may be equated to the origin of the partial path currently being evaluated. The maximum allowable arrival time for a leg under consideration for pre-pending onto a given existing partial path P', then becomes the existing partial path departure time minus some selected time allotted for the necessary change from the leg under consideration arriving at the origin $O_l$ of the existing partial path P' to the partial path transportation vehicle. It is a given that pre-pending a leg (trip segment) from a trip on a single rail line will always meet this criteria, since there is no requirement to change at the change location (A or B as an example) on the same rail line, e.g., rail lines 110, 112 at either of the "change A" 120 or "change B" 122 locations.

Only legs having an arrival time earlier than the maximum arrival time just considered will be evaluated for further pre-pending onto the existing partial path. Whether or not to pre-pend the leg (add the leg to the existing partial path) may be determined according to the relationship that, if the latest departure time label for the leg is ≥to the earliest journey departure time of the query, the leg is added to the queue and becomes the next journey in the succession of the K shortest if the latest leg origin $O_l$ is the journey origin "o".

By way of example according to the present disclosure, a network of trip legs G, such that individual legs g are contained in the set (g∈G) may be established. Each trip leg g may be considered to have the following static properties:

$SL_g$: the origin location for the leg
$ST_g$: the start time of the leg
$EL_g$: the destination location for the leg
$ET_g$: the end time of the leg A query may be processed according to the present disclosure, again turning to FIG. 3, which may in block 410 ask for journeys from an origin "o" to a destination "d" leaving after some selected time "t." A first labeling pass, using Dijkstra's algorithm or the like, may generate an additional property for each leg g, $LD_g$: the latest time a passenger can depart the origin to get on this leg, as indicated in block 420.

A path P may be defined as illustrated in block 422, as a sequence of trip legs $<g_1, \ldots g_c>$ with the following properties:

$c>0$;

as indicated in block 424 for each consecutive pair of legs (j, k) in a path P, the destination (end location) for the leg $g_j$ ($EL_g)_j$=origin (start location) for the leg $g_k$ ($SL_g)_k$ and (start time for the leg $g_k$ ($ST_g)_k$–end time for the leg $g_j$ ($ET_g)_j$≥some selected time to change from leg $g_j$ to leg $g_k$ ("change Time$_{jk}$") destination (end location) of the leg $g_c$ ("$EL_{gc}$")=journey destination "d".

The following notations may be utilized by way of explanation of one embodiment of the present disclosure as shown in block 426 of FIG. 3:

the origin (start location) of a path P ("$SL_P$"=origin (start location) of the first leg ("$SL_{g1}$");
start time of a path ("$ST_P$")=start time of the first leg ("$ST_{g1}$"); and,
end time of a path ("$ET_P$")=end time of the last leg ("$ET_{gc}$").

A partial path is a path with $SL_P \neq$ the journey origin "o", indicated in block 430.

A journey, as shown in block 432, is a path with an origin (start location) for the path ("$SL_P$")(and by definition a partial path working back from the destination "d") with a start location ("$SL_P$")=the journey origin "o."

Enumerating the journeys with a maximum duration $dur_{max}$ less than some threshold value, which may be set in block 432, may start with adding to a priority query a single leg path for each reachable leg into the journey destination "d". That is in mathematical notation, illustrated in block 434 of FIG. 3, leg g from within the set of legs G in the network, and with a destination at the journey destination "d" and with an arrival time at the destination "d" $ET_g$ such that the destination arrival time minus the latest time of departure from the origin "o" to reach the respective leg g is less than or equal to the journey maximum duration.

{g|g∈G and $EL_g=d$ and $ET_g$-latest departure time to get on leg$_g LD_g \leq dur_{max}$}

Each partial path P' removed from the priority queue, as indicated in block 440, can be extended to make the new partial path P' where the new partial path P' is the former partial path P' with the addition of the new leg g, with the new leg g destination $EL_g$ at the start $SL_P$, of the existing partial path P', and the arrival time of the leg g, $ET_g$ is less than or equal to the departure time of the first leg of the partial path minus the selected change time, and the arrival time of the partial path minus the latest time of departure from the journey origin "o" to get on the respective new leg is less than or equal to the maximum journey duration:

{P'=<g>^P and g∈G and $EL_g=SL_P$ and $ET_g \leq (ST_P-$change Time)

and $ET_P-LD_g \leq dur_{max}$

Each journey sequentially so removed from the priority queue, as indicated in blocks 442 and 446, where the origin of the latest added leg is the journey origin "o" is the next answer in the enumeration of journeys in increasing duration order. Bounding of the path enumeration according to a possible embodiment of the disclosure may be considered to involve considering a new trip leg as a possible extension to an existing partial path. As such, the label indicating the latest departure time from the origin to reach the trip leg and the existing partial path arrive time at the destination "d" may be used to calculate in constant time the minimum possible journey duration that can result from this extension. Thus, according to the present disclosure, the search can be effectively culled using the maximum journey duration until K shortest paths have been found, as indicated in block 448 of FIG. 3.

The initial trip leg labeling, utilizing such as Dijkstra's algorithm or the like can also label each location with the minimum journey duration from the origin without additional complexity. The following expression can be used to give a lower bound on possible journey durations from extending an existing partial path with such a labeled leg:

{Partial Path arrive time–(current leg arrive time–min duration from origin to path origin)}.

The $1^{st}$ and $3^{rd}$ terms are constant for a given partial path. Also, the legs arriving at a location are "threaded" in monotonically non-increasing arrival time order. Thus, the expression will be monotonically non-decreasing as the system and method progresses through the "threaded" arrivals, and the maximum journey duration threshold can be used to cull this scan. Denoting the minimum time it is possible to travel from the origin to a stop s as $minTime_s$, the condition for extending a partial path P becomes:

$P'=<g>^P$ and g∈G and $EL_g=SL_P$ and $(ET_P-dur_{max}+minTime_{SLP}) \leq$ end time$_g \leq (ST_P-$changeTime)

and $ET_P-LD_g \leq dur_{max}$

According to the present disclosure, the journey planning system and method may provide for improved performance through the utilization of trip segment labeling rather than leg labeling. The latest depart labels, as noted above, may be generated by applying a Dijkstra-type algorithm directly to the trip leg network. However, the running complexity of this algorithm is proportional to the number of trip legs in the network. The set of legs for a trip is:

{leg$_{t,i,j}$|0≤i<j<stopcount$_t$}.

That is, for the trip on rail line 110 illustrated in FIGS. 1A-C and 2, the possible legs are the arcs 500, 502, 504, 506, 508 and 510.

The same information can be derived from setting up a network of trip segments. These are all the pairs of consecutive stops for a trip. The set of segments for a trip is:

{segment$_{t,i,i+1}$|0≤i<stopcount$_t$}.

That is, the arcs 500, 502 and 504.

Each segment may store pointers (arcs) for up to three other segments, which may be, e.g., the next segment of the same trip, the next segment departing this segment's to stop (segment destination) and the next segment departing this segment's from stop (origination). That is, for the segment 160 on the rail line 110 as illustrated in FIGS. 1B and 2, the stored information for that segment may include a pointer to the next segment of the trip (162), the segment 168 of the trip on rail line 112 and the segment 166 of the trip on rail line 112.

A labeling algorithm can be used to generate the latest depart labels in time proportional to the number of trip segments. This network requires a slightly more complicated label than the trip leg case, discussed above, as illustrated in FIG. 5.

Figure 5:
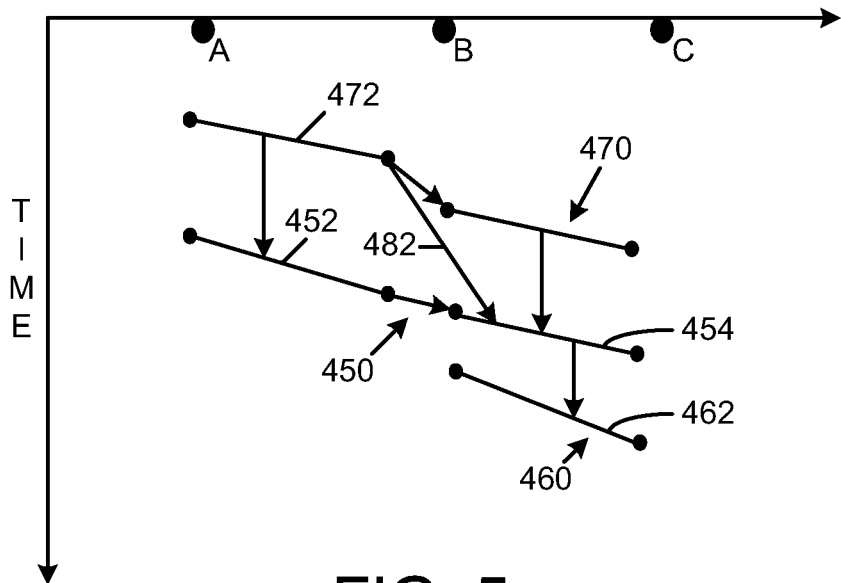
FIG. 5 shows schematically a model of a portion of a journey labeling apparatus and method of a possible embodiment of the disclosure.

As illustrated by way of example in FIG. 5 the second segment 454 of a trip 450 having segments 452 from a stop A to a stop B and can be reached by departing stop A on the first segment 452 of the trip 450, and will be labeled with departure time for the segment 452. However, as illustrated, it is not possible to change from trip 450 to a trip 460 having a segment 462 at the stop B. This may be due to a minimum change time requirements or that the rail line of which trip 450 forms a part has a pick-up only stop at stop B. The latest depart time to get to the segment 462 of the trip 460 is, therefore, in the illustration of FIG. 5, the first segment 472 of a trip 470 on another rail line the route of which includes the trip 470, with the illustrated stop at stop B.

In addition, when the second segment 454 of the trip 450 is processed, it needs to know both the latest depart time, and the latest possible journey depart time to change trips at B (the start of the segment 454).

The "latest depart time from origin" label may be propagated from the segment 452 to the next segment in the trip, segment 454 and to any connecting segment(s) (not shown) of the trip 450 at the destination (stop C) of the 454. The "latest depart after change" label may be propagated to the next departure from the origin of the segment 454 (stop B).

The output of the labeling step may then be:
latestDepart (segment$_{t,i,i+1}$)
latestDepartAfterChange (segment$_{t,i,i+1}$)
the former being propagated from segment 452 and the latter from segment 472 of trip 470.

The set of paths from a query origin to a segment is a superset of the set of paths from the query origin with changes onto the segment. Thus, for all segments, latestDepart (segment$_{t,i,i+1}$)≥latestDepartAfterChange (segment$_{t,i,i+1}$). For each trip leg, there is a segment corresponding to getting on the same trip at the same stop. The latest depart label for the trip leg will equal the "latest depart after change" label for a boarding segment (i.e. how far one travels after one has boarded a trip will not affect what time one needed to board, i.e., could have left the journey origin in order to board at the boarding point).
Therefore, for each g☐G, g=leg$_{t,ij}$:
LD$_g$=latestDepartAfterChange (segment$_{t,i,i+1}$)

The number of trip segments is linearly proportional to the number of stops on a trip (the number of trip legs is proportional to stopcount$^2$). For the IPTIS UK network, there is an order of magnitude fewer segments than legs (legs are proportional to n$^2$ and segments proportional to n, n being stop count). Thus, the slightly more complex labeling process is more than made up for by the reduction in label count.

According to another embodiment of the present disclosure, there may be a performance enhancement arising from increased memory efficiency due to trip-segment-based path enumeration. With trip segment labeling, the only reason to have a trip leg network is the path enumeration. However, the path enumeration algorithm can run directly on the segment network due to several factors. A trip leg has a segment corresponding to boarding, and another segment corresponding to alighting (not necessarily different segments). A trip leg between stop i and stop j on trip t (leg$_{t,i,j}$) can be represented with the segment pair (segment$_{t,i,i+1}$, segment$_{t,j-1,j}$) the boarding and alighting segments.

The path enumeration state may thus store a pair of pointers to segments instead of one pointer to a trip leg, one pointer to the boarding segment and one to the alighting segment. In culling out a journey plan as discussed above, pre-pending new legs onto an existing partial path, only a tiny fraction of total possible trip legs are used. The extra pointers use negligible storage. Further, All trip legs with a common boarding segment will have the same set of possible connections for extending a path back to the origin. Lastly, when the algorithm is looking to extend a partial path, the head of the partial path has a pointer to the tightest connection, which in turn has a pointer to the previous arrival. This, therefore forms a linked list to be traversed. In this linked list all the legs with a common alight segment appear in a group. If each segment has a pointer to the previous segment in the trip, and the tightest connecting segment, the set of trip legs can be generated in the same time complexity as traversing an explicit linked list of trip legs.

Figure 6A:
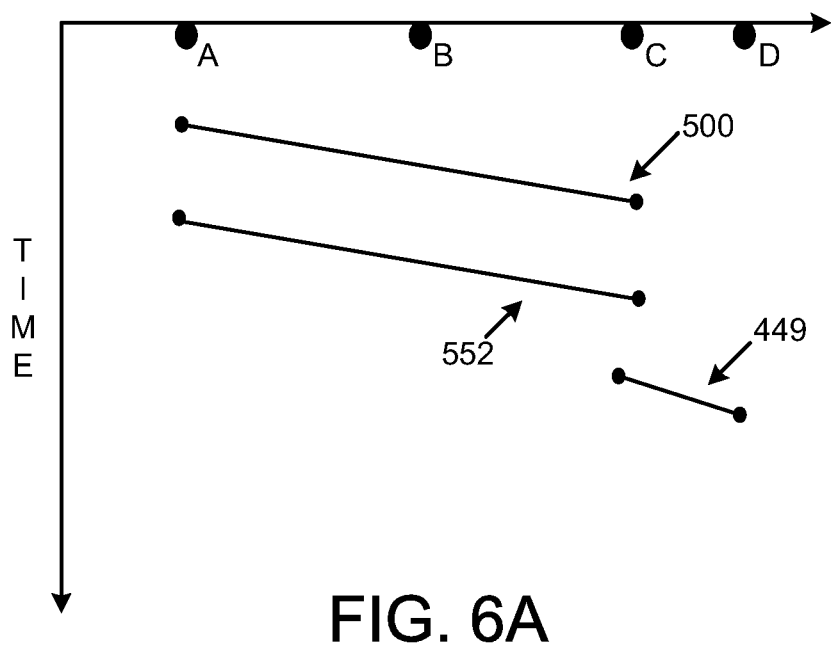
FIGS. 6A-D) show schematically a model of a portion of a journey labeling apparatus and method of a possible embodiment of the disclosure.

FIG. 6A illustrates in diagram form a trip network, with three trips 550, 552 and 554.

Figure 6B:
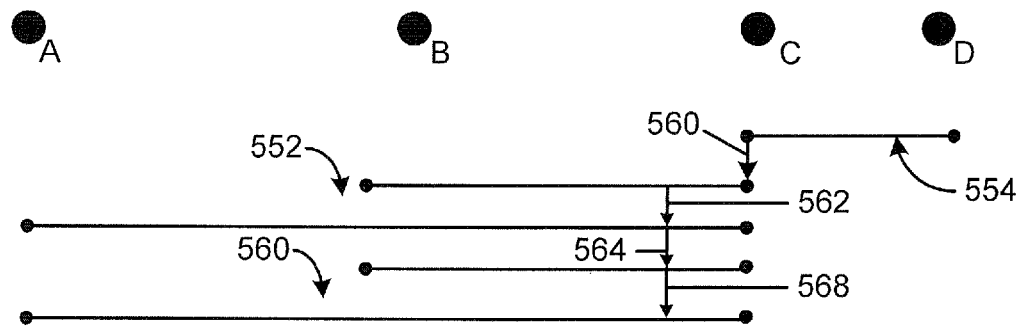

The connection information stored for the departure of the leg of trip 554 from stop C in a trip leg network is shown in the diagram of FIG. 6B. The arrow 560 represents a tightest change, while the arrows 562, 564, 568 represent previous arriving legs (extending the wait time at stop C to board the trip 554 segment). The same connection information for the segment network may also be illustrated in the diagram of FIG. 6C. The arrows 570 link to the respective previous segment for the same trip 550, 552.

Figure 6C:
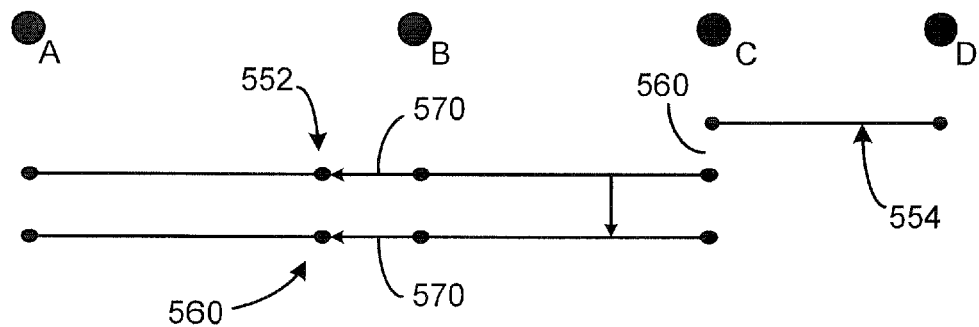
Figure 6D:
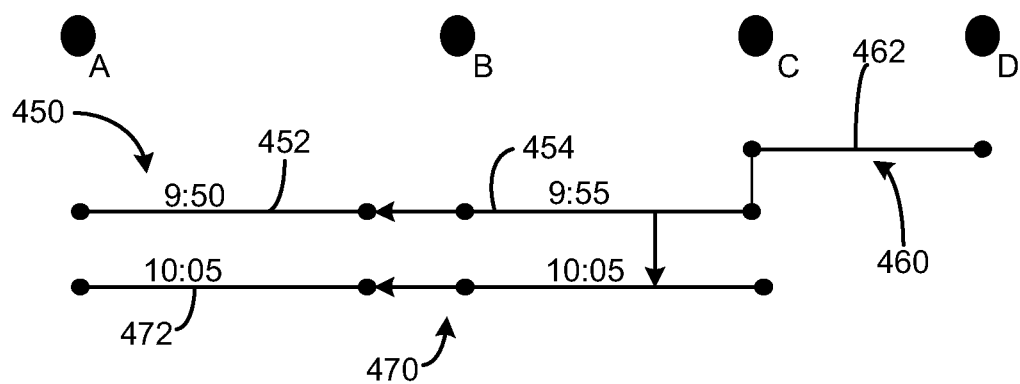

Transforming the path enumeration algorithm in this fashion, removes the need for a trip leg network, which reduces memory consumption by an order of magnitude. Transforming the network in this fashion may also allow further culling of the extension code. Once a passenger gets on a trip, he or she must be able to continue down the length of the trip. Thus, the latest depart label will be monotonically non-decreasing moving forward through the trip, i.e. latestDepart (segment$_{t,i,i+1}$)≤latestDepart(segment$_{t,j,j+1}$) where j>i. When generating the set of trip legs with a common alight segment, the code traverses progressively earlier parts of the trip. Thus, if a segment is reached which has a latest depart label before the latest valid journey depart time, there is no need to continue searching back through this trip. To illustrate this, utilizing the trip diagram of FIGS. 6A-C the segment network of FIGS. 6A-C is illustrated in FIG. 6D with latest depart labels added. If paths departing after 10:00 AM are required, the segment 452 of trip 450 need not be visited once it is determined that the segment 454 has a latest depart time of before 10:00 AM, since segment 452 must of necessity also have such a latest depart time.

According to the present disclosure, the system and method may also be considered to employ an improved bounding of the initial leg labeling. The first step in the general procedure may be to label all trip legs with the latest possible depart time from the origin to reach this leg.

At the start of the K shortest paths procedure, according to the present disclosure, there may be no information available about how far through time one needs to search. This information may not be known until the journey enumeration phase has run, and, e.g., the results checked with a final filter. However, because journeys are being enumerated primarily in order of arrival time, for a given journey arrival time, there is no need to label legs which arrive after that time. Also, the best journey arrival time is an output of the initial labeling step (when labeling a leg into the destination, the arrival time of that leg is an upper bound for the depart time for any leg that could be part of the earliest arrival journey). Thus the system and method according to the present disclosure may use the following procedure:

The system and method may first run latest depart time labeling until all segments departing before the best journey arrive time are labeled. Second, the system and method, using journey enumeration with these labels may find all options for this arrive time. If there are not enough results, i.e., less than K, the system and method may thirdly go back to the first step and retain all existing labels, and continue labeling to a next best destination arrival time. According to the present disclosure, the system and method may also be considered to employ an optimistic initial labeling step, wherein the initial labeling of trip legs with latest depart time can be optimistic (i.e. only needs to be the upper bound on possible departure time). This label may then be used to limit the enumeration of journey options in later steps, so there may be a performance cost in making it optimistic. However, there can be a net benefit to ignoring computationally expensive criteria in the initial labeling, especially if the extra criteria rarely affect travel time. These more expensive checks can be done as part of the filtering of final journeys.

For example, change time allowances can be a function of the different trips involved. It is rare that this function is used (i.e. most stops only have a single change time value), and even for stops with a range of change times, most real connections are not in the affected window. For example, a trip leg may have a change time of 3 or 5 minutes, depending on the other trip involved. Only trip legs arriving exactly 3 or 4 minutes before need the full rules applied. The initial labeling may then just use the minimum time for a stop, then filtering out the rare journey options which have invalid connection (illegal journeys).

Exemplary results implementing principles of the present disclosure are summarized below. The implementation was in C++, and simulated operation on a simplified version of the UK Rail network. The simplifications included only single day trips, no connections (splits of joins), no transfers (e.g. tube legs), and no stop restrictions (pick-up or set-down), or wait times at stops (arrive time=depart time for all trip stops). The prototype was operated in an "all day" mode, unlike IPTIS' traditional time order mode. The prototype was utilized to enumerate all journeys leaving after a given time on the day, in order of increasing duration. Thus, journeys found early in the search could be far away from the specified leave time.

Below is an example of the output, with a Euston to Manchester, leave after 10:00 am journey query. There were 5078 Locations, 17697 routes and 243095 trips loaded, with 224,306 segments in all. The prototype took 00:00:00.9562409 to build a segment index. Before building a TripLegNetworkt total memory=114 MB. The prototype took 11436 ms to build a network with 1,601,973 arcs. 1,571,988 legs had connections after alight. At this point the total memory=225 MB. With the prototype starting to mark trip segments the total memory=243,132,096. The prototype took 9 ms to seed 207 segments and 24 ms to mark 117,135 trip segments, with the total memory=243,132,096. The origin used was London Euston and the destination Manchester Piccadilly. The fastest journey found had a duration=02:11:00. Longest KPath journey to find duration ($max_{dur}$) was therefore set to =03:11:00. The prototype found 1,000 journeys in 11 ms with a $max_{dur}$=2:57 and a MinCostInQueue of 177; 2,000 journeys in 15 ms, with a $max_{dur}$=3:09 and a MinCostInQueue of 189 and 2,288 journeys in 20 ms with $max_{dur}$ between 2:11 and 3:25. Total memory used=187 MB.

291 nodes were found that were reached by 4,630 paths and 5,180 paths extended, with 38,103 extensions culled by latest depart time.

With the fastest journey duration of 2 hrs 11 mins the search by the prototype found 2,288 journey options with duration up to 3 hrs 11 mins. Generating this set of journeys was very fast≈100 ms in run time. The tolerance of 1 hour from fastest journey was arbitrarily chosen. The number of options increases hugely as a function of this tolerance. To operate at this speed, the journey planning using the prototype was relatively limited. There were no max changes, via, not via or routing guide pre-checks. Also, no fare lookups or legality was done. These criteria were left to a next layer of culling taking the prototype list output.

The ability to rank paths in this way according to a proposed embodiment may allow offering a much wider range of "slower journeys with . . . " options. Currently, the journey planning has a "slower journeys with fewer changes" function. However, with proposed embodiments of the present disclosure this can now be extended to any property that can be defined on a journey. Possible useful journey criteria may be cheaper valid ticket, different primary TOC, cheaper non-quota controlled ticket, different fare route, different quota controlled ticket (with quota controlled tickets, being cheaper is not better if sold out).

Another useful function could be finding the set of fastest routing guide ("RG") legal journeys. With some current solutions, heuristics are employed to reduce the incidence of routing guide illegal journeys, which are conservative in culling the search, so the most common error is finding routing guide illegal journeys. There are also some circumstances where routing guide legal journeys are missed, as the pre-checks incorrectly rule out a valid intermediate station. Utilizing a proposed embodiment of the disclosure, the system and method may keep finding slower options, and performing full routing guide checks on them, thus facilitating the best, legal answer.

It will be understood by those skilled in the art that the ultimate path(s) selected using the further sorting criteria(ae), e.g., ones not very susceptible to utilization in the initial K shortest path sorting, e.g., due to not meeting the criteria for application of the principle of optimality, could be in the form of a ticket(s), an itinerary or the like, provided to the traveller. The ticket(s), itinerary, etc. could be obtained by the traveller using the system of FIG. 4, through the kiosk 345, or over the Internet, or could similarly be provided over the Internet, by mail or in person if the ticket(s), itinerary, etc. is generated by an agent of the traveller, such as a travel agent, or customer service agent for the transportation entity. Either of the latter two could be using their own server 301. Such an agent could generate the ticket(s), itinerary, etc.

The secondary further sorting may be done by the traveller/traveller's agent using a further automated sorting algorithm, e.g. through the user interface at the kiosk 345 or on the agent's server 301. Alternatively the traveller/traveller's agent could be provided with the K shortest path list and do the additional sorting of the paths on that list (which again could be provided in the form of a list of alternative tickets, itineraries or the like from which to choose). The traveller/traveller's agent can then select from the list, based on the additional sorting criteria(ae). This list of choices may be delivered to the traveller/traveller's agent in the ways discussed above.

Figure 4:
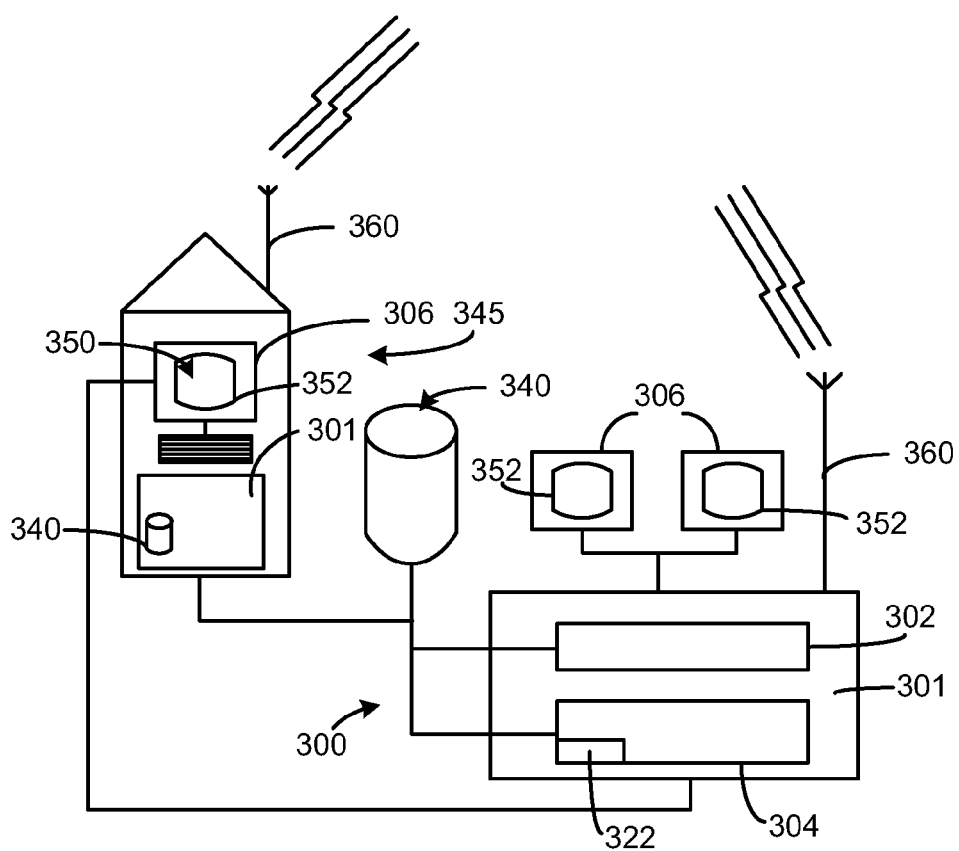
FIG. 4 shows schematically and in block diagram form a possible embodiment of the disclosure.

The journey planning system of the disclosure can be implemented in software (e.g., firmware), hardware, or a combination thereof. In the currently contemplated best mode, the journey planning system is implemented in software, as an executable program, which may be executed by a special or general purpose digital computer, such as a personal computer (PC; IBM-compatible, Apple-compatible, or otherwise), workstation, minicomputer, or mainframe computer. An example of a general purpose computer that can implement the journey planning system of the present disclosure is shown in FIG. 4. In FIG. 4, the journey planning system is denoted by reference numeral 300.

Generally, in terms of hardware architecture, as shown in FIG. 4, the computer 301 includes a processor 302, memory 304, and one or more input and/or output (I/O) devices 306 (or peripherals) that are communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 302 is a hardware device for executing software, particularly that stored in memory 304. The processor 302 may be any custom made or commercially available processor, a central processing unit (CPU), an auxiliary processor among several processors associated with the computer 301.

The memory 304 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 304 may incorporate electronic, magnetic, optical, and/or other types of storage media. Note that the memory 304 may have a distributed architecture, where various components are situated remote from one another, but can be accessed by the processor 302.

The journey planning system 300 may be implemented as a source program, executable program (object code), script, or any other entity comprising a set of instructions to be performed. 322. Furthermore, the journey planning system 300 may be written as (a) an object oriented programming language, which has classes of data and methods, or (b) a procedure programming language, which has routines, subroutines, and/or functions.

The I/O devices 306 may include input devices output devices and devices that communicate both inputs and outputs.

When the Journey planning system 300 is implemented in software, as is shown in FIG. 4, it should be noted that the journey planning system 300 can be stored on any computer readable medium for use by or in connection with any computer related system or method. The journey planning system 300 can be embodied in any computer-readable medium for use by or in connection with an instruction execution system, apparatus, or device or other system that can fetch the instructions for the instruction execution system to execute the instructions, The journey planning 300 may also include a interface 350 as part of the input output devices 306, which may employ a suitable graphical user interface 352 such as Windows available from Microsoft, and may be positioned, for example, in a kiosk 345 in or around a train station, for access by a traveler, as part of a desktop or laptop computer system in a travel agent's office, for access by an agent on behalf of a traveler or on a server, such as at a transportation service provider's office for supporting customer service. The database 340 or pertinent parts of the database, for example the makeup of the space/time transportation network for the next twenty four hours, may be at the site of user interface or in a remote centralized location. The database may be accessed for data/information as the journey planning system is in operation or to download data/information for subsequent use by the journey planning, utilizing any of the wireless or wired data/information communication options noted above, including wired or wireless local area networks, wide area networks, intranet networks and the internet, with wireless telephone or other wireless communication utilizing antennas 360 illustrated in FIG. 4.

Specific rules/models and knowledge base(s), etc. employed in the various journey planning systems and methods of the present disclosure are not expressly disclosed, nor is specific software or code. It is believed that those skilled in the art would understand how to assemble and use such systems to implement the functionalities of the present disclosure.

As disclosed, the journey planning system and method according to the present disclosure employ a branch and bound procedure that processes the shortest path from the destination towards the origin and bans each leg in turn or forces it into a journey path until the leg initiates at the selected origin and successively creates journeys that originate at the desired origin and terminate at the desired destination (i.e., answers a query regarding the K shortest paths from the origin to the destination of the journey, which may also include starting after a selected start time). The system and method of the present disclosure may find the K shortest paths through the same network to find different journey options, such as minimum possible journey duration, and efficiently cull the search using a maximum journey duration, and thereafter apply post filter rules needing to be applied to the resultant set of K shortest path journeys with successively higher cost function values to match the "best" journey according to the additional requirements of the post filter rules applied.

It should be emphasized that the above-described embodiments of the present disclosure, particularly, any "preferred" embodiments, are merely possible examples of implementations, merely set forth for a clear understanding of the principles of the present disclosure. Many variations and modifications may be made to the above-described embodiments without departing substantially from the spirit and principles of the disclosure, All such modifications and variations are intended to be included herein within the scope of this disclosure and protected by the following claims.

APPENDIX A

```
Main
Label each trip leg with latest depart time for query (–∞ for unreachable)
Set Max journey duration to the minimum journey duration found plus a
buffer
For each trip leg into destination
    If leg arrive time – latest depart label <= Max journey duration
        Queue.add(Path(leg))
    End-If
End-For
While (queue not empty)
    Pop from queue to Top
    If (Top.Origin = query origin)
        Output Journey
    Else
        Extend(Top)
    End If
End while
Extend(Partial Path)
Latest Journey Depart = Partial path arrive – Max journey duration
Change Stop = Partial Path.Origin
Max prefix arrive = Partial Path.Depart Time – Change Time
```

APPENDIX A-continued

```
For each leg arriving at change stop by Max prefix arrive
    If leg.latest depart label >= Latest Journey Depart
        Queue.add(Path(leg, partial path))
    End If
End For
```

The invention claimed is:

1. A method of journey planning comprising:
    determining the K shortest paths through a time/space transportation network including a plurality of nodes for scheduled travel of a plurality of vehicles of one or more modes of transportation between an origin location and a destination location, at least one of the plurality of vehicles being scheduled for departure from the origin location, and at least one of the plurality of vehicles being scheduled for arrival at the destination location, determining the K shortest paths including:
        defining a plurality of trip legs between nodes of the plurality of nodes in the time/space transportation network;
        defining a plurality of paths from the origin location to the destination location in the time/space transportation network, wherein each path of the plurality of paths comprises one or more of the plurality of trip legs; and
        enumerating a plurality of journeys for transportation of a passenger on one or more vehicles of the plurality of vehicles from the origin location to the destination location, the plurality of journeys being enumerated from the plurality of paths that satisfy a maximum journey threshold that is greater than a minimum cost value calculated according to a selected cost function, and utilizing a branch and bound analysis of partial paths, thereby defining a set of the K shortest paths in the plurality of paths;
    applying one or more sorting criteria to the plurality of journeys; and
    selecting a journey from the plurality of journeys based on application of the one or more sorting criteria, wherein at least the determining the K shortest paths, defining of the plurality of paths and enumerating the plurality of journeys are performed utilizing an apparatus including a processor and computer-readable medium including computer program code executable by the processor to cause the apparatus to at least perform the same.

2. The method of claim 1, wherein the plurality of paths have respective cost values,
    wherein enumerating of the plurality of journeys is performed utilizing an algorithm that filters the plurality of paths according to the respective cost values and the maximum journey threshold, the algorithm producing a ranking of the plurality of paths by increasing cost value of the respective cost values, and
    wherein the journey of the plurality of journeys is selected further based on the ranking.

3. The method of claim 1, wherein defining the plurality of trip legs further comprises associating a start time, an end time and a change time with the origin location, and
    wherein defining the plurality of paths comprises determining the plurality of paths based on one or more of the start time, end time or change time.

4. The method of claim 1, wherein enumerating the plurality of journeys comprises removing from consideration paths that fail to satisfy the maximum journey threshold.

5. The method of claim 1, wherein the plurality of paths have respective cost values,
    wherein enumerating of the plurality of journeys is performed utilizing an algorithm that filters the plurality of paths according to the respective cost values and the maximum journey threshold, the algorithm producing a ranking of the plurality of paths by increasing cost value of the respective cost values, and
    wherein the journey of the plurality of journeys is selected further based on the ranking.

6. The method of claim 1, wherein the one or more sorting criteria are applied to and the journey selected from only the plurality of journeys.

7. The method of claim 1, wherein the one or more sorting criteria include criteria not employed in determining the K shortest paths.

8. The method of claim 1, wherein the plurality of journeys have respective, increasing cost values.

9. The method of claim 1, wherein the one or more sorting criteria include criteria not employed in determining the K shortest paths.

10. The method of claim 1, wherein enumerating the plurality of journeys comprises utilizing the branch and bound analysis of partial paths from the destination location back toward the origin location.

11. The method of claim 1, wherein the time/space transportation network comprises a public transportation network.

12. The method of claim 1, wherein at least one of the one or more sorting criteria fails to obey the principle of optimality.

13. The method of claim 1, wherein the selected cost function represents at least one of a trip duration, a total fare, or a journey that avoids one or more stations.

14. The method of claim 1, wherein the sorting criteria comprise one or more fare rules.

15. An apparatus forming a system for journey planning comprising:
    a processor; and
    a computer-readable medium including computer program code executable by the processor to cause the apparatus to at least:
    determine the K shortest paths through a time/space transportation network including a plurality of nodes for scheduled travel of a plurality of vehicles of one or more modes of transportation between an origin location and a destination location, at least one of the plurality of vehicles being scheduled for departure from the origin location, and at least one of the plurality of vehicles being scheduled for arrival at the destination location, the computer being caused to determine the K shortest paths includes being caused to:
        define a plurality of trip legs between nodes of the plurality of nodes in the time/space transportation network;
        define a plurality of paths from the origin location to the destination location in the time/space transportation network, wherein each path of the plurality of paths comprises one or more of the plurality of trip legs; and
        enumerate a plurality of journeys for transportation of a passenger on one or more vehicles of the plurality of vehicles from the origin location to the destination location, the plurality of journeys being enumerated from the plurality of paths that satisfy a maximum journey threshold that is greater than a minimum cost value calculated according to a selected cost function, and utilizing a branch and bound analysis of partial paths, thereby defining a set of the K shortest paths in the plurality of paths;

apply one or more sorting criteria to the plurality of journeys; and select a journey from the plurality of journeys based on application of the one or more sorting criteria.

16. The apparatus of claim 15, wherein the plurality of journeys have respective, increasing cost values, and
wherein the one or more sorting criteria include criteria not employed in determination of the K shortest paths.

17. The apparatus of claim 15, wherein the selected cost function represents at least one of a trip duration, a total fare, or a journey that avoids one or more stations.

18. The apparatus of claim 15, wherein the sorting criteria comprise one or more fare rules.

* * * * *